United States Patent
Pal et al.

(10) Patent No.: US 10,803,068 B2
(45) Date of Patent: Oct. 13, 2020

(54) SYSTEMS AND METHODS FOR RECOMMENDATION OF TOPICAL AUTHORITIES

(71) Applicant: Facebook, Inc., Menlo Park, CA (US)

(72) Inventors: Aditya Pal, San Jose, CA (US); Amaç Herdağdelen, Mountain View, CA (US); Sourav Chatterji, Fremont, CA (US); Sumit Taank, San Jose, CA (US); Deepayan Chakrabarti, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 681 days.

(21) Appl. No.: 15/011,221

(22) Filed: Jan. 29, 2016

(65) Prior Publication Data

US 2017/0220577 A1 Aug. 3, 2017

(51) Int. Cl.
*G06F 16/9535* (2019.01)
*G06Q 10/10* (2012.01)
*G06F 16/2457* (2019.01)
*G06Q 50/00* (2012.01)

(52) U.S. Cl.
CPC .... *G06F 16/24578* (2019.01); *G06F 16/9535* (2019.01); *G06Q 10/10* (2013.01); *G06Q 50/01* (2013.01)

(58) Field of Classification Search
CPC ........... G06F 17/30867; G06F 17/3053; G06F 16/24578; G06F 16/9535; G06Q 10/10; G06Q 50/01

USPC .......................................... 707/738, 732, 734
See application file for complete search history.

(56) References Cited

U.S. PATENT DOCUMENTS

| | | | |
|---|---|---|---|
| 9,367,878 B2 * | 6/2016 | Rao ........................ | G06Q 50/01 |
| 9,799,081 B1 * | 10/2017 | Lewis .................... | G06Q 50/01 |
| 2008/0140666 A1 * | 6/2008 | D'Alton Harrison ...................... | G06F 17/30867 |
| 2012/0054278 A1 * | 3/2012 | Taleb ..................... | G06Q 50/01 709/204 |
| 2013/0086063 A1 * | 4/2013 | Chen ................. | G06F 17/30595 707/736 |
| 2013/0346329 A1 * | 12/2013 | Alib-Bulatao ......... | G06Q 10/06 705/319 |

OTHER PUBLICATIONS

Cai, Zhiyuan et al., "Wikification via Link Co-occurrence," Proceedings of the 22nd ACM International Conference on Information & Knowledge Management (CIKM '13), pp. 1087-1096, Oct. 2013.
(Continued)

*Primary Examiner* — Robert W Beausoliel, Jr.
*Assistant Examiner* — Pedro J Santos
(74) *Attorney, Agent, or Firm* — Sheppard Mullin Richter & Hampton LLP

(57) ABSTRACT

Systems, methods, and non-transitory computer-readable media can determine one or more respective topics of interest for at least some users of a social networking system. At least some of the topics can be propagated to at least a first user, wherein the propagated topics were determined to be of interest to users that follow the first user in the social networking system. At least one topic from the propagated topics for which the first user is a topical authority is determined.

20 Claims, 7 Drawing Sheets

(56) References Cited

OTHER PUBLICATIONS

Gattani, Abhishek et al., "Entity Extraction, Linking, Classification, and Tagging for Social Media: A Wikipedia-Based Approach," Proceedings of the VLDB Endowment (PVLDB), vol. 6, No. 11, pp. 1126-1137, Aug. 2013.

Guo, Zhaochen et al., "Robust Entity Linking via Random Walks," Proceedings of the 23rd ACM International Conference on Information and Knowledge Management (CIKM '14), pp. 499-508, Nov. 2014.

* cited by examiner

SYSTEMS AND METHODS FOR RECOMMENDATION OF TOPICAL AUTHORITIES

FIELD OF THE INVENTION

The present technology relates to the field of content provision. More particularly, the present technology relates to techniques for recommending authorities that produce content relating to various topics.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine one or more respective topics of interest for at least some users of a social networking system. At least some of the topics can be propagated to at least a first user, wherein the propagated topics were determined to be of interest to users that follow the first user in the social networking system. At least one topic from the propagated topics for which the first user is a topical authority is determined.

In an embodiment, the systems, methods, and non-transitory computer readable media are configured to associate a topic label that corresponds to the at least one topic with each user that follows the first user in the social networking system.

In an embodiment, the systems, methods, and non-transitory computer readable media are configured to provide at least one user that is associated with the topic label with a recommendation for following a different user in the social networking system, the different user also being a topical authority for the topic.

In an embodiment, the systems, methods, and non-transitory computer readable media are configured to determine that the user has dismissed recommendations for following one or more topical authorities for the topic at least a threshold number of times and remove an association between the user and the topic label.

In an embodiment, the systems, methods, and non-transitory computer readable media are configured to determine that the user has dismissed recommendations for following a particular topical authority at least a threshold number of times and cause recommendations for following the particular topical authority to be prevented from being presented to the user.

In an embodiment, the systems, methods, and non-transitory computer readable media are configured to obtain respective biographies that were defined by at least some of the users user through the social networking system and determine one or more respective topics that are of interest to each of the users by applying a named entity extraction model to the respective biography of the user.

In an embodiment, the systems, methods, and non-transitory computer readable media are configured to determine a respective score for each topic that was propagated to the first user, determine at least one topic that has a highest score, and determine that the first user is a topical authority for the at least one topic.

In an embodiment, the systems, methods, and non-transitory computer readable media are configured to determine a respective z-score for each of the topics and adjust the respective z-score for each topic based at least in part on a log factor.

In an embodiment, the log factor used to adjust a z-score for a topic is determined based on a number of followers of the first user that were determined to be interested in the topic.

In an embodiment, the systems, methods, and non-transitory computer readable media are configured to determine that a new user has signed up for an account on the social networking system, determine one or more topics that are of interest to the new user, and associate respective topic labels that correspond to the one or more topics with the new user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
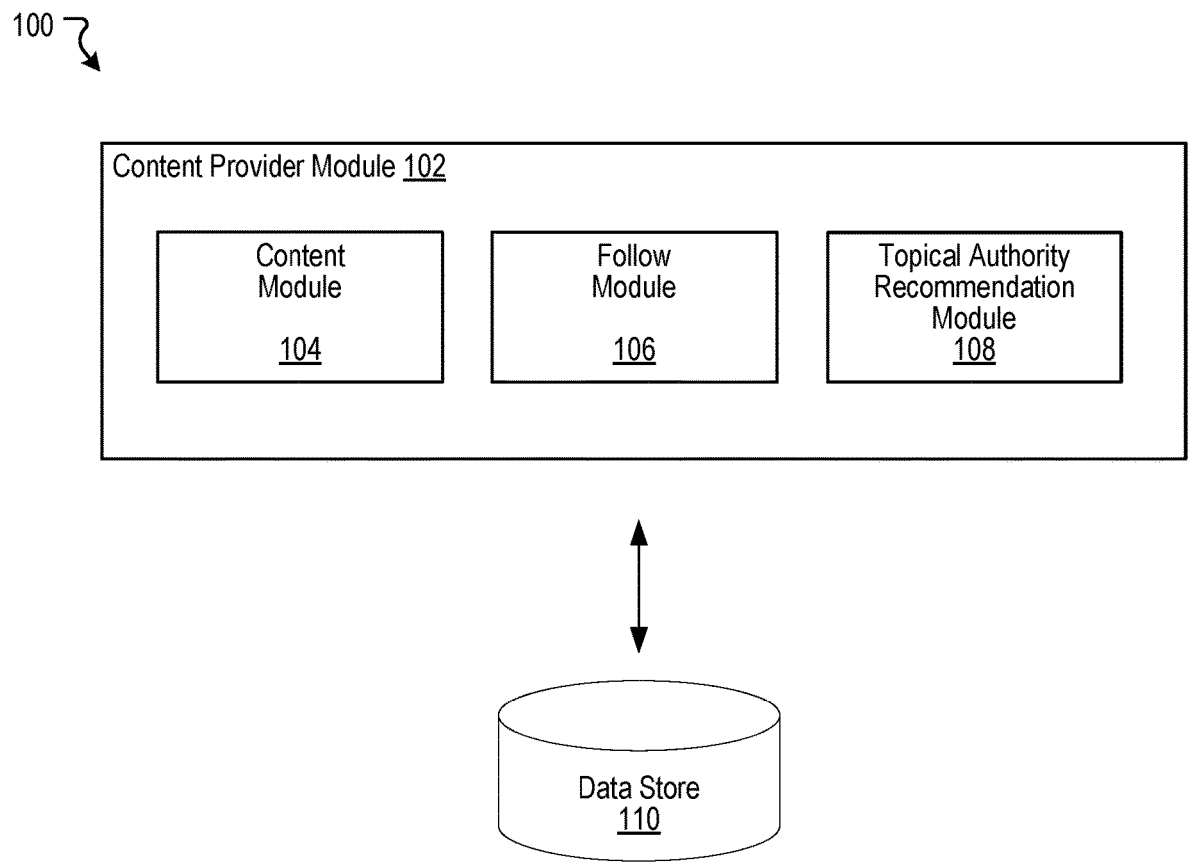
FIG. 1 illustrates an example system including an example content provider module configured to provide access to various content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Recommending Topical Authorities

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, users may post various content items to the social networking system. In general, content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content of the first user from being included in the user's content feed by simply "unfollowing" the first user.

Each user of the social networking system may produce content that relates to various topics (e.g., basketball, cats, origami, music, technology, etc.). In some instances, a user of the social networking system may be interested in viewing content items that relate to a given topic (e.g., origami) but may not know which users to follow to cause content items relating to that topic to be included in the user's content feed. In general, users of the social networking system can create a respective biography that may describe the user and also indicate topics that are of interest to the user. However, given that there may be many users of the social networking system, it is typically not feasible for a user to look over content items that were posted by every user or their respective biographies to determine which users to follow in order to see content items of a given topic. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, certain users of the social networking system can be determined to be topical authorities for various topics. In some embodiments, a user can be identified as a topical authority for a topic based on topics that are determined to be of interest to other users that follow the user. In general, a user that is identified as a topical authority for a certain topic is typically seen by other users of the social networking system as being highly correlated with that topic. For example, a star basketball player may widely be associated with the topic of basketball by users of the social networking system. In another example, an influential sports writer may also be widely associated with the topic of basketball by users of the social networking system. In general, users may be identified as topical authorities due to their status in society, the nature of their profession, or the types of content they produce, to name some examples. Identifying such topical authorities is useful because it allows users easily identify which users to follow in order to access content that relates to topics of the user's interest.

FIG. 1 illustrates an example system 100 including an example content provider module 102 that is configured to provide access to various content items, according to an embodiment of the present disclosure. As shown in the example of FIG. 1, the content provider module 102 can include a content module 104, a follow module 106, and a topical authority recommendation module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 110, as shown in the example system 100. The at least one data store 110 can be configured to store and maintain various types of data. For example, the data store 110 can store information describing various content that has been posted by users of a social networking system, entities that have been identified as being topical authorities of one or more topics, and topic labels that have been associated with users of the social networking system. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

The content provider module 102 can be configured to provide users with access to content that is posted through a social networking system. For example, the content module 104 can provide a first user with access to content items through an interface that is provided by a software application (e.g., a social networking application) running on a computing device of the first user. In some instances, the first user can interact with the interface to post content items to the social networking system. Such content items may include text, images, audio, and videos, for example. In various embodiments, other users of the social networking system can access content items posted by the first user. In one example, the other users can access the content items by simply searching for the first user through the interface, for example, by user name. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user.

The topical authority recommendation module 108 is configured to determine whether certain users of the social networking system are authorities on one or more given topics. Users that are authorities on various topics can be identified in the social networking system as topical authorities for those topics. Such topical authorities can be recommended to users of the social networking system based on the respective topical interests of those users. More details regarding the topical authority recommendation module 108 will be provided below with reference to FIG. 2.

Figure 2:
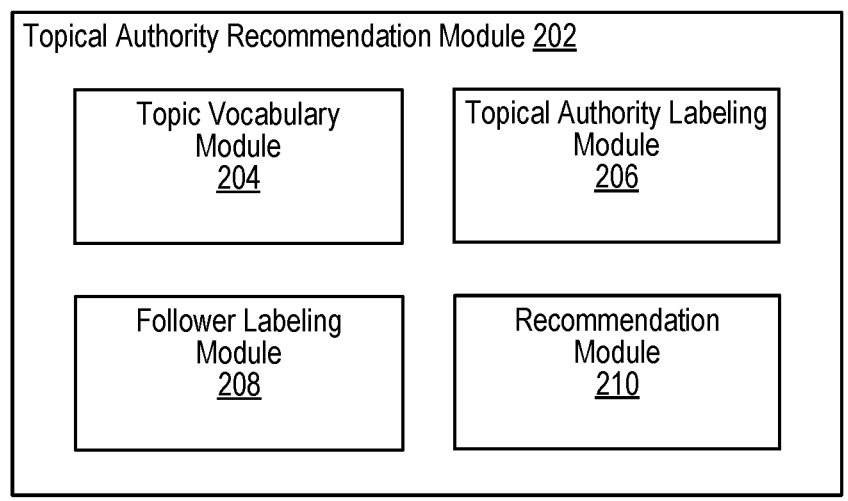
FIG. 2 illustrates an example of a topical authority recommendation module, according to an embodiment of the present disclosure.

FIG. 2 illustrates an example of a topical authority recommendation module 202, according to an embodiment of the present disclosure. In some embodiments, the topical authority recommendation module 108 of FIG. 1 can be implemented as the topical authority recommendation module 202. As shown in FIG. 2, the topical authority recommendation module 202 can include a topic vocabulary module 204, a topical authority labeling module 206, a follower labeling module 208, and a recommendation module 210.

The topic vocabulary module 204 can be configured to determine a set of topics for which topical authorities may be identified. In some embodiments, the set of topics are determined from a set of topics that have been pre-defined, for example, in an information source such as an encyclopedia. In some embodiments, the topic vocabulary module 204 can determine the set of topics from a whitelisted set of topics that are manually defined by a curator.

The topical authority labeling module 206 can use the set of topics that are determined by the topic vocabulary module 204 to determine topics that are of interest to users of the social networking system. In some embodiments, the topical authority labeling module 206 identifies a set of users that may potentially be topical authorities. In one example, users that have at least a threshold number of followers (e.g., 1,000 followers, 1,500 followers, etc.) may be included in the set of users that may potentially be topical authorities. For each user in the set of users, the topical authority labeling module 206 can determine one or more topics that are of interest to the user's followers. In some embodiments, the topical authority labeling module 206 determines the topics of interest to the user's followers by analyzing the respective biographies of each of the user's followers. As mentioned, users of the social networking system can create a respective biography that may describe the user and also indicate the types of topics that are of interest to the user. In such embodiments, the topic authority labeling module 206 can utilize a named entity detection model to identify topics (or interests) that are mentioned, or referenced, in the respective biographies of the user's followers. For example, for a user's biography that states "Big fan of l.a. rivers. Love hunting and fishing", the topic authority labeling module 206 can determine that the user is interested in the topics "Los Angeles Rivers", "Hunting", and "Fishing". In some embodiments, topics identified in a user's biography are corroborated against the set of topics that were determined by the topic vocabulary module 204. In such embodiments, topics that were identified in a user's biography that do not appear in the set of terms determined by the topic vocabulary module 204 are discarded and not used in the topical authority determination process. In some instances, different terms may be used in user biographies to refer to the same topic. For example, a basketball team "Los Angeles Rivers" may be referenced using different terms such as "l.a. rivers" or "rivers fan". In some embodiments, different terms that refer to the same topic may be identified and merged. Thus, in the example above, a biography of a first user that includes the term "l.a. rivers" and a biography of a second user that includes the term "rivers fan" are both determined to show an interest in the topic "Los Angeles Rivers". In some embodiments, the topical authority labeling module 206 determines the topics of interest to the user's followers from hashtags that correspond to posts that the user's followers created and/or interacted with (e.g., liked, commented on, and/or shared) through the social networking system. For example, a follower may create a post that includes the hashtag "foodweek2016". In such embodiments, a mapping table that correlates hashtags and topics can be utilized to determine the topics that correspond to the hashtag "foodweek2016". In some embodiments, the mapping table may be provided by a domain expert that manually associates hashtags to topics. In some embodiments, the mapping table may be determined automatically, for example, based on topic to hashtag co-occurrences in content items (e.g., posts) created through the social networking system. Other implementations are possible. For example, in some embodiments, additional user-level signals may be utilized to determine topics of interest to the user's followers in addition to analyzing user biographies and/or hashtags. One example approach involves determining a particular attribute of users and using that attribute to find topical authorities of that particular attribute. For example, the respective professions of each user can be determined and used to find topical authorities for each of those professions. In one example, a user that has at least a threshold ratio of followers that belong to a particular profession can be labeled as a topical authority for that profession.

Some example approaches for utilizing named entity detection models are described in A. Gattani, D. S. Lamba, N. Garera, M. Tiwari, X. Chai, S. Das, S. Subramaniam, A. Rajaraman, V. Harinarayan, and A. Doan "Entity Extraction, linking, classification, and tagging for social media: A wikipedia-based approach," *Proceedings of the VLDB*

*Endowment (PVLDB)*, 2013, Z. Guo and D. Barbosa "Robust entity linking via random walks," *International Conference on Information and Knowledge Management (CIKM)*, 2014, and Z. Cai, K. Zhao, K. Q. Zhu, and H. Wan "Wikification via link co-occurrence," *International Conference on Information and Knowledge Management (CIKM)*, 2013 all of which are incorporated herein by reference.

Once the topics that are of interest to the user's followers are determined, the topical authority labeling module 206 can propagate the topics (or labels) to the user being followed. For example, a first user of the social networking system, e.g., a basketball player "Bronson", may have 1,000 followers that are interested in the topic "basketball", 600 followers that are interested in the topic "Los Angeles Rivers", and 50 followers that are interested in the topic "origami". In this example, each of these topics can be propagated to the user Bronson. This propagation can be performed for each user in the set of users that may potentially be topical authorities. Thus, for example, a second user may have 1,200 followers that are interested in the topic "basketball" and 300 followers that are interested in the topic "music". In another example, a third user may have 1,500 followers that are interested in the topic "basketball", 800 followers that are interested in the topic "weight training", and 100 followers that are interested in the topic "comedy". The topic authority labeling module 206 can determine the respective distributions of the various topics among the users based on the propagation of the topics to the users. In some embodiments, such distributions are log scale distributions.

In some embodiments, the topical authority labeling module 206 can apply a scoring technique (e.g., z-scoring technique) to determine any topics that are highly correlated with a given user. Such topics can be associated with the user, thereby identifying the user in the social networking system as a topical authority for those topics. For example, for a given topic "basketball", the topical authority labeling module 206 can determine the mean ($\mu_{basketball}$) and the standard deviation ($\sigma_{basketball}$) for the "basketball" topic. In general, the mean represents the average log frequency of all users to which the topic basketball was propagated. Using the example above, the mean for the "basketball" topic among the first user, the second user, and the third user can be computed by summing the number of followers of each user that are interested in the "basketball" topic (i.e., 1,000+1,200+1,500) and dividing this result by the total number of users to which the basketball topic was propagated (i.e., 3). The topical authority labeling module 206 can then compute, for each user, the respective scores (e.g., z-scores) for each of the topics that were propagated to the user as follows:

$$score_{topic} = \frac{k_{user} - \mu_{topic}}{\sigma_{topic}},$$

where $k_{user}$ is the number of followers of the user that are interested in a topic, where $\mu_{topic}$ is the mean for the topic (e.g., basketball), and where $\sigma_{topic}$ is the standard deviation for the topic (e.g., basketball).

Thus, in the example above, respective scores for the topics "basketball", "Los Angeles Rivers", and "origami" will be generated for the first user, e.g., Bronson. In some embodiments, the score for each topic is adjusted by multiplying the score by a log factor based on the number of the user's followers that are determined to be interested in the topic as follows:

$$adjusted\ score_{topic} = score_{topic} * \log n,$$

where $score_{topic}$ is the score for the topic that was determined for the user and where n is the number of the user's followers that are determined to be interested in the topic.

For example, a basketball player "Bronson" may have 1,000 followers that are interested in the topic "basketball", 600 followers that are interested in the topic "Los Angeles Rivers", and 50 followers that are interested in the topic "origami". In this example, the score for the topic "basketball" is multiplied by log 1,000, the score for the topic "Los Angeles Rivers" is multiplied by log 600, and the score for the topic "origami" is multiplied by log 50. The topics that were propagated to the user can be ranked based on the respective adjusted scores determined for the topics. In some embodiments, the topical authority labeling module 206 can associate the highest ranked topic with the user. For example, if the topic "basketball" was ranked higher than the topics "Los Angeles Rivers" and "origami", then the user Bronson can be identified as a topical authority for the "basketball" topic. In some embodiments, a user may be associated with a threshold number of highest ranking topics, thereby identifying the user as a topical authority for multiple topics. In some embodiments, a user may be associated with any topics that satisfy a threshold adjusted score.

The follower labeling module 208 can propagate topics associated with topical authorities to the respective followers of those topical authorities. For example, if the user Bronson was identified as a topical authority for the topic "basketball", then the follower labeling module 208 can associate a "basketball" topic label with each of the followers of the user Bronson. In various embodiments, such topic labels can be used to recommend topical authorities to users based on their respective topic labels (i.e., interests).

The recommendation module 210 is configured to recommend topical authorities to users. More details regarding the recommendation module 210 will be provided below with reference to FIG. 3.

Figure 3:
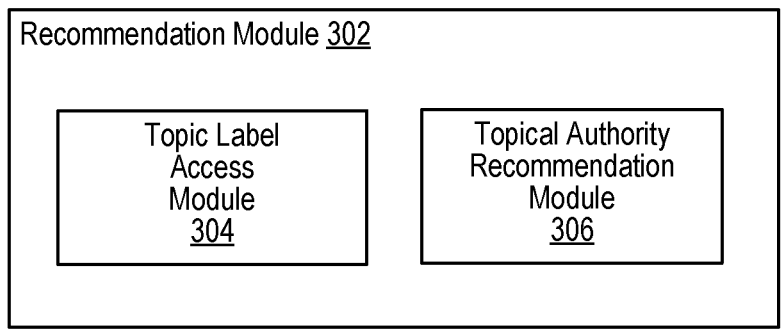
FIG. 3 illustrates an example of a recommendation module, according to an embodiment of the present disclosure.

FIG. 3 illustrates an example of a recommendation module 302, according to an embodiment of the present disclosure. In some embodiments, the recommendation module 210 of FIG. 2 can be implemented as the recommendation module 302. As shown in FIG. 3, the recommendation module 302 can include a topic label access module 304 and a topical authority recommendation module 306.

Once topic labels have been propagated, the recommendation module 302 can be utilized to provide topical authority recommendations to users of the social networking system. In various embodiments, the topic label access module 304 can determine which topic labels are associated with a given user. In one example, a user may be associated with the topic labels "basketball" and "origami". In this example, the user may be provided with recommendations for topical authorities that were identified for the "basketball" topic and/or the "origami" topic. The topical authority recommendation module 306 can provide such recommendations to the user, for example, through the interface that the user is accessing the social networking system. The user can then decide whether to follow a recommended topical authority. In general, once the user follows a topical authority, some or all of the content items that are posted by the topical authority will automatically be included in a content feed through which content items are presented to the user.

In some instances, a new user to the social networking system may not be following any other users of the social networking system. In such instances, since the new user is not following anyone in the social networking system, the user is not likely to be associated with any topic labels. Thus, it may be difficult to provide the user with recommendations for topical authorities that may be of interest to the user. In some embodiments, a new user can be prompted to select one or more topics that are of interest to the user. For example, the topical authority recommendation module 306 may prompt the user for such selections during the onboarding process when the user is first signing up for an account through the social networking system. In such embodiments, the topical authority recommendation module 306 can provide the user with recommendations for topical authorities based on the selected topics. In some instances, the new user may have created a biography through the social networking system that includes various terms or indicates the user's interests. In some embodiments, the respective biographies of such new users may be analyzed, for example, using a named entity detection model, as described above, to determine a set of topics from the terms included in the biography. In such embodiments, topical authorities that correspond to topics that were included in the set of topics can be provided to the user as recommendations. In some instances, a user may dismiss a threshold number of recommendations for topical authorities for a given topic. In some embodiments, rather than continuing to provide the user with recommendations that may not be of interest to the user, such recommendations can be discontinued once a threshold number of dismissals are received. In some embodiments, once the threshold number of dismissals are received, any topic labels corresponding to the given topic that were previously associated with the user can be disassociated from the user. In some instances, a user may dismiss a threshold number of recommendations for a particular topical authority. In some embodiments, rather than continuing to provide the user with recommendations that may not be of interest to the user, such recommendations for the particular topical authority can be discontinued once a threshold number of dismissals are received.

Figure 4:
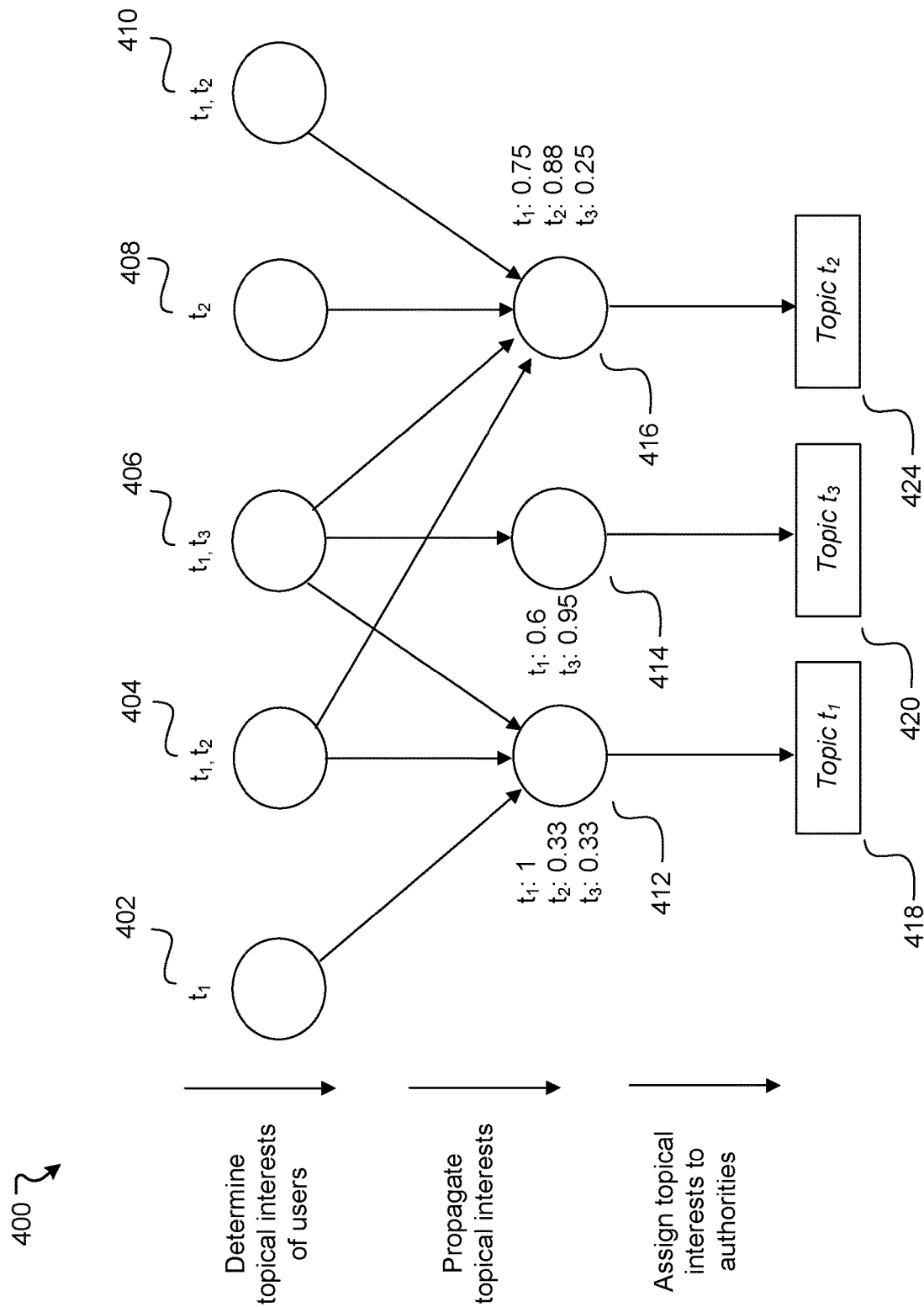
FIG. 4 illustrates an example diagram illustrating the assignment of topical authorities, according to various embodiments of the present disclosure.

FIG. 4 illustrates an example diagram 400 illustrating the assignment of topical authorities 412, 414, 416, according to various embodiments of the present disclosure. The example diagram 400 includes a set of nodes 402, 404, 406, 408, 410 that each correspond to a user of a social networking system. In this example, each user 402, 404, 406, 408, 410 has created a respective biography through the social networking system. In various embodiments, a set of topics for each user can be extracted from each user's biography, for example, using a named entity detection model, as described above. In the example of FIG. 4, a topic $t_1$ was determined from the biography of the user 402, the topics $t_1$ and $t_2$ were determined from the biography of the user 404, the topics $t_1$ and $t_3$ were determined from the biography of the user 406, the topic $t_2$ was determined from the biography of the user 408, and the topics $t_1$ and $t_2$ were determined from the biography of the user 410.

The topics determined for each user can be propagated to other users of the social networking system that the user is following. In this example, the user 402 is following the user 412 and, therefore, the topic $t_1$ that was determined from the biography of the user 402 is propagated to the user 412. The user 404 is following the user 412 and the user 416 and, therefore, the topics $t_1$ and $t_2$ that were determined from the biography of the user 404 are propagated to the user 412 and the user 416. The user 406 is following the user 412, the user 414, and the user 416 and, therefore, the topics $t_1$ and $t_3$ that were determined from the biography of the user 406 are propagated to the users 412, 414, and 416. The user 408 is following the user 416 and, therefore, the topic $t_2$ that was determined from the biography of the user 408 is propagated to the user 416. Finally, the user 410 is also following the user 416 and, therefore, the topics $t_1$ and $t_2$ that were determined from the biography of the user 410 are propagated to the user 416. The topics propagated for each user 412, 414, and 416 can be scored and ranked, as described above. In this example, for the user 412, a score of 1 was determined for the topic $t_1$, a score of 0.33 was determined for the topic $t_2$, and a score of 0.33 was determined for the topic $t_3$. Further, for the user 414, a score of 0.6 was determined for the topic $t_1$ and a score of 0.95 was determined for the topic $t_3$. Moreover, for the user 416, a score of 0.75 was determined for the topic $t_1$, a score of 0.88 was determined for the topic $t_2$, and a score of 0.25 was determined for the topic $t_3$. Based on such topic scores, the users 412, 414, and 416 can each be identified as a topical authority for a given topic or, in some embodiments, for multiple topics. In the example of FIG. 4, the user 412 is determined to be a topical authority for the topic $t_1$ 418, the user 414 is determined to be a topical authority for the topic $t_3$ 420, and the user 416 is determined to be a topical authority for the topic $t_2$ 424. Such assignments of topical authorities are provided merely as examples and, depending on the user data, multiple users (e.g., user 412, 414, 416) may be identified as topical authorities on the same topic. As mentioned, topics assigned to topical authorities can be propagated back to the respective followers of those topical authorities. In the example of FIG. 4, a topic label for the topic $t_1$ can be associated with the users 402, 404, and 406 since these users are following the topical authority 412. Further, a topic label for the topic $t_3$ can be associated with the user 406 since this user is following the topical authority 414. Moreover, a topic label for the topic $t_2$ can be associated with the users 404, 406, 408, and 410 since these users are following the topical authority 416.

Figure 5:
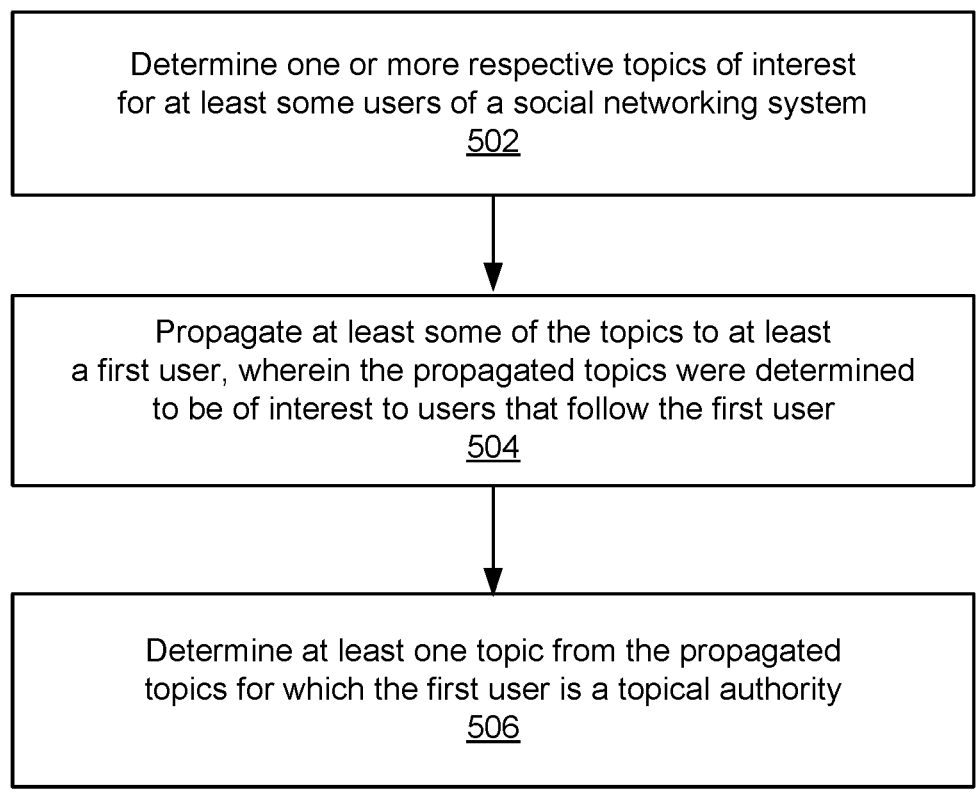
FIG. 5 illustrates an example process for determining topical authorities, according to various embodiments of the present disclosure.

FIG. 5 illustrates an example process 500 for determining topical authorities, according to various embodiments of the present disclosure. It should be appreciated that there can be additional, fewer, or alternative steps performed in similar or alternative orders, or in parallel, within the scope of the various embodiments discussed herein unless otherwise stated. At block 502, one or more respective topics of interest for at least some users of a social networking system are determined. At block 504, at least some of the topics are propagated to at least a first user, wherein the propagated topics were determined to be of interest to users that follow the first user in the social networking system. At block 506, at least one topic from the propagated topics for which the first user is a topical authority is determined.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
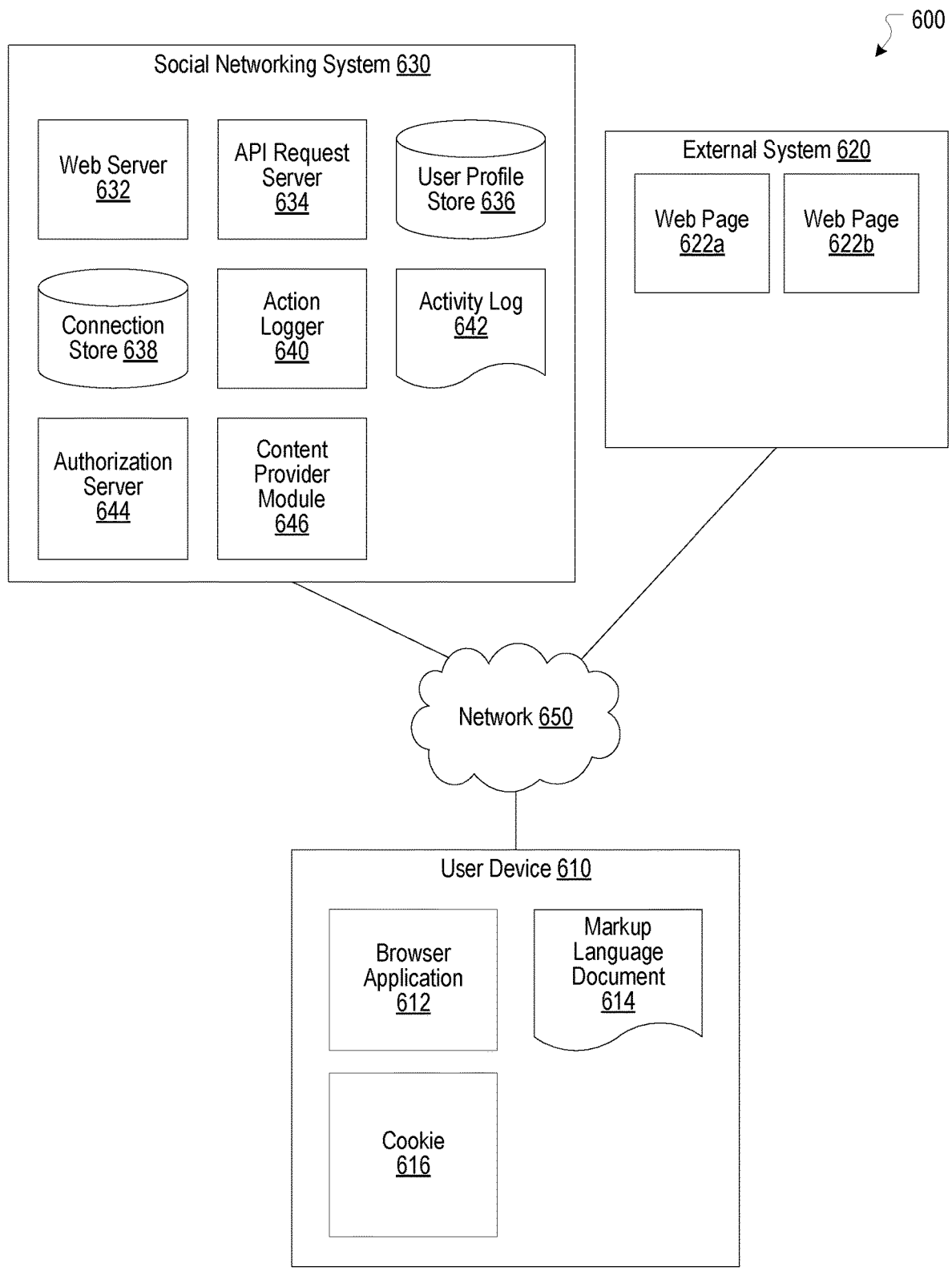
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. As discussed previously, it should be appreciated that there can be many variations or other possibilities.

Hardware Implementation

Figure 7:
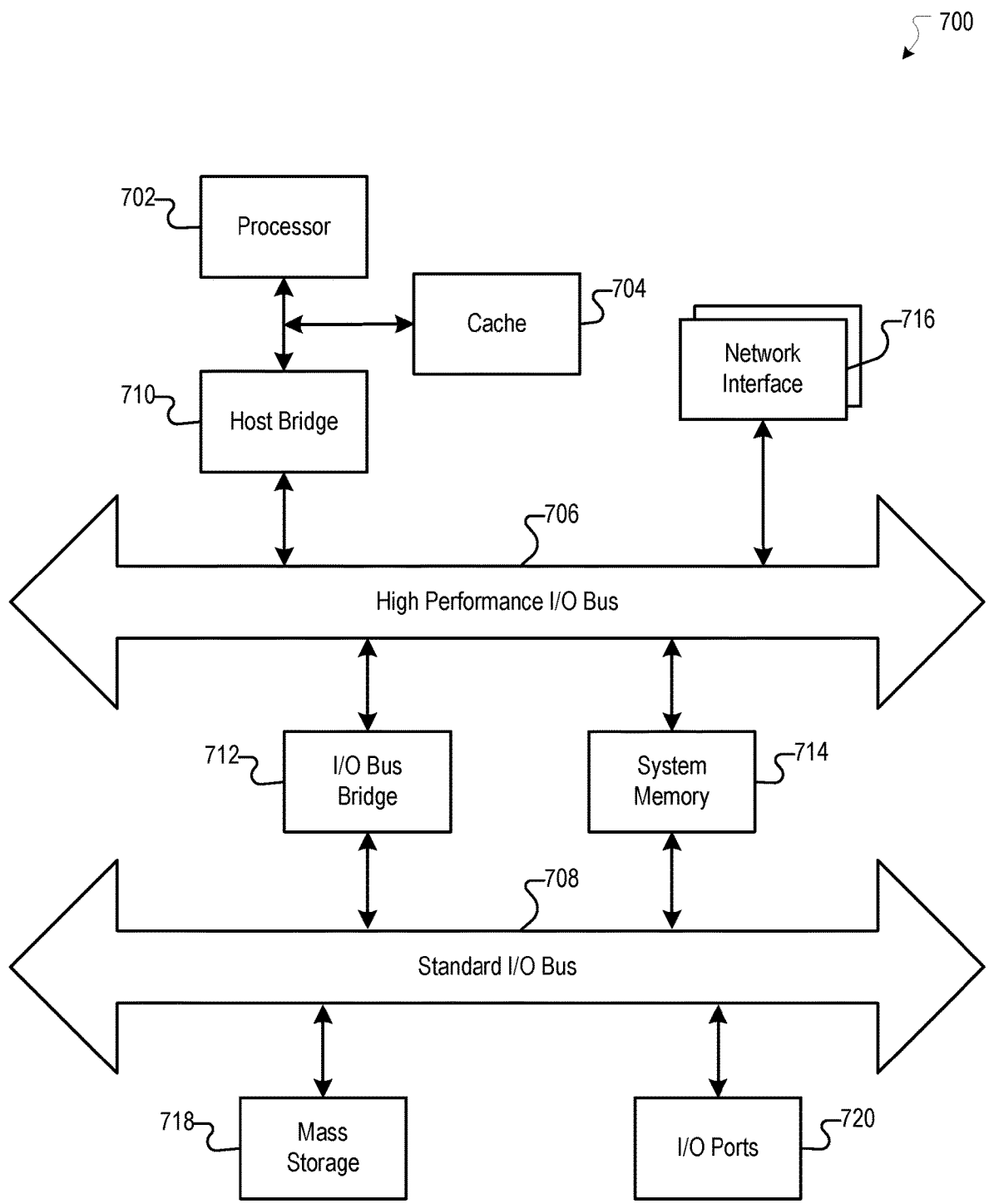
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, a set of topics of interest for a set of users on a social networking system;
    propagating, by the computing system, at least a subset of the set of topics to at least a first user, wherein the propagated subset of topics are determined to be of interest to at least one user of the set of users, wherein the at least one user follows the first user on the social networking system;

ranking, by the computing system, the propagated subset of topics based at least in part on a number of followers associated with the propagated subset of topics who follow the at least one user and a number of users in the set of users;

determining, by the computing system, at least one topic from the propagated subset of topics for which the first user is a first topical authority, based at least in part on the ranking of the propagated subset of topics; and providing, by the computing system, the first user as a recommendation to a second user on the social networking system based on a topic of interest associated with the second user.

2. The computer-implemented method of claim 1, the method further comprising:

associating, by the computing system, a topic label that corresponds to the at least one topic with the at least one user that follows the first user on the social networking system.

3. The computer-implemented method of claim 2, the method further comprising:

providing, by the computing system, the at least one user that is associated with the topic label with a recommendation for following a second user on the social networking system, wherein the second user is a second topical authority for the at least one topic.

4. The computer-implemented method of claim 3, the method further comprising:

determining, by the computing system, that the at least one user has dismissed recommendations for following topical authorities, including the second topical authority, for the at least one topic at least a threshold number of times; and removing, by the computing system, an association between the user and the topic label.

5. The computer-implemented method of claim 3, the method further comprising:

determining, by the computing system, that the at least one user has dismissed recommendations for following the second topical authority at least a threshold number of times; and causing, by the computing system, recommendations for following the second topical authority to be prevented from being presented to the at least one user.

6. The computer-implemented method of claim 1, wherein determining a set of topics of interest for a set of users on a social networking system further comprises:

obtaining, by the computing system, respective biographies that were defined by the set of users on the social networking system; and determining, by the computing system, the set of topics that are of interest to each of the set of users by applying a named entity extraction model to the respective biographies of each user.

7. The computer-implemented method of claim 1, wherein determining at least one topic from the propagated subset of topics for which the first user is a first topical authority further comprises:

determining, by the computing system, a respective score for each topic of the subset of topics that was propagated to the first user;

determining, by the computing system, at least one topic from the propagated subset of topics that has a highest score; and determining, by the computing system, that the first user is a first topical authority for the at least one topic.

8. The computer-implemented method of claim 7, wherein determining the respective score for each topic of the subset of topics that was propagated to the first user further comprises:

determining, by the computing system, a respective z-score for each topic of the subset of topics; and adjusting, by the computing system, the respective z-score for each topic of the subset of topics based at least in part on a log factor.

9. The computer-implemented method of claim 8, wherein the log factor used to adjust a z-score for each topic of the subset of topics is determined based on a number of followers of the first user that were determined to be interested in each respective topic of the subset of topics.

10. The computer-implemented method of claim 1, the method further comprising:

determining, by the computing system, that a new user has signed up for an account on the social networking system;

determining, by the computing system, one or more topics that are of interest to the new user; and associating, by the computing system, respective topic labels that correspond to the one or more topics with the new user.

11. A system comprising:

at least one processor; and a memory storing instructions that, when executed by the at least one processor, cause the system to perform:

determining a set of topics of interest for a set of users on a social networking system;

propagating at least a subset of the set of the topics to at least a first user, wherein the propagated subset of topics are determined to be of interest to at least one user of the set of users, wherein the at least one user follows the first user on the social networking system;

ranking the propagated subset of topics based at least in part on a number of followers associated with the propagated subset of topics who follow the at least one user and a number of users in the set of users;

determining at least one topic from the propagated subset of topics for which the first user is a first topical authority, based at least in part on the ranking of the propagated subset of topics; and providing the first user as a recommendation to a second user on the social networking system based on a topic of interest associated with the second user.

12. The system of claim 11, wherein the system further performs:

associating a topic label that corresponds to the at least one topic with the at least one user that follows the first user on the social networking system.

13. The system of claim 12, wherein the system further performs:

providing the at least one user that is associated with the topic label with a recommendation for following a second user on the social networking system, wherein the second user is a second topical authority for the at least one topic.

14. The system of claim 13, wherein the system further performs:

determining that the at least one user has dismissed recommendations for following topical authorities, including the second topical authority, for the at least one topic at least a threshold number of times; and removing an association between the user and the topic label.

15. The system of claim 13, wherein the system further performs:
    determining that the at least one user has dismissed recommendations for following the second topical authority at least a threshold number of times; and
    causing recommendations for following the second topical authority to be prevented from being presented to the at least one user.

16. A non-transitory computer-readable storage medium including instructions that, when executed by at least one processor of a computing system, cause the computing system to perform a method comprising:
    determining a set of topics of interest for a set of users on a social networking system;
    propagating at least a subset of the set of topics to at least a first user, wherein the propagated subset of topics are determined to be of interest to at least one user of the set of users, wherein the at least one user follows the first user on the social networking system;
    ranking the propagated subset of topics based at least in part on a number of followers associated with the propagated subset of topics who follow the at least one user and a number of users in the set of users;
    determining at least one topic from the propagated subset of topics for which the first user is a first topical authority, based at least in part on the ranking of the propagated subset of topics; and
    providing the first user as a recommendation to a second user on the social networking system based on a topic of interest associated with the second user.

17. The non-transitory computer-readable storage medium of claim 16, wherein the computing system further performs:
    associating a topic label that corresponds to the at least one topic with the at least one user that follows the first user on the social networking system.

18. The non-transitory computer-readable storage medium of claim 17, wherein the computing system further performs:
    providing the at least one user that is associated with the topic label with a recommendation for following a second user on the social networking system, wherein the second user is a second topical authority for the at least one topic.

19. The non-transitory computer-readable storage medium of claim 18, wherein the computing system further performs:
    determining that the at least one user has dismissed recommendations for following topical authorities, including the second topical authority, for the at least one topic at least a threshold number of times; and
    removing an association between the user and the topic label.

20. The non-transitory computer-readable storage medium of claim 18, wherein the computing system further performs:
    determining that the at least one user has dismissed recommendations for following the second topical authority at least a threshold number of times; and
    causing recommendations for following the second topical authority to be prevented from being presented to the at least one user.

* * * * *